(12) United States Patent
Gerstl et al.

(10) Patent No.: US 9,135,584 B2
(45) Date of Patent: Sep. 15, 2015

(54) METHOD AND APPARATUS TO MODEL CONTENT STATE AND ACCESS CONTROL IN BACKEND-SYSTEMS AND BUSINESS PROCESSES

(75) Inventors: Peter Gerstl, Holzgerlingen (DE); Frank Neumann, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1356 days.

(21) Appl. No.: 12/395,649

(22) Filed: Feb. 28, 2009

(65) Prior Publication Data

US 2010/0223570 A1 Sep. 2, 2010

(51) Int. Cl.
*G06F 3/048* (2013.01)
*G06Q 10/06* (2012.01)

(52) U.S. Cl.
CPC ..................................... *G06Q 10/06* (2013.01)

(58) Field of Classification Search
CPC ... G06F 3/0481; G06F 3/04817; G06F 3/048; G06Q 10/0631; G06Q 10/063; G06Q 10/06
USPC ........... 705/7.11, 7.12, 7.13, 7.26, 7.27, 7.23, 705/7.24, 348; 714/E11.123; 717/104, 105; 715/772, 771, 764, 700
See application file for complete search history.

(56) References Cited

U.S. PATENT DOCUMENTS

| | | | |
|---|---|---|---|
| 5,220,657 A | 6/1993 | Bly et al. | |
| 5,734,837 A * | 3/1998 | Flores et al. | 705/7.13 |
| 5,798,752 A * | 8/1998 | Buxton et al. | 715/863 |
| 7,945,599 B2 * | 5/2011 | Allen et al. | 707/803 |
| 8,010,940 B2 * | 8/2011 | van Wyk et al. | 717/105 |
| 8,024,405 B2 * | 9/2011 | Shukla et al. | 709/205 |
| 2003/0131353 A1 | 7/2003 | Blom et al. | |
| 2004/0102990 A1 | 5/2004 | Jones | |
| 2005/0027915 A1 | 2/2005 | Gragg | |
| 2006/0143057 A1 * | 6/2006 | Sadiq | 705/7 |
| 2007/0179828 A1 * | 8/2007 | Elkin et al. | 705/8 |
| 2007/0214197 A1 | 9/2007 | Bolik et al. | |
| 2007/0255713 A1 | 11/2007 | Li et al. | |
| 2008/0059631 A1 | 3/2008 | Bergstrom et al. | |
| 2009/0157462 A1 * | 6/2009 | Morinville | 705/8 |

FOREIGN PATENT DOCUMENTS

GB 2 354 415 B 9/2003

* cited by examiner

*Primary Examiner* — Igor Borissov
(74) *Attorney, Agent, or Firm* — Prentiss Johnson; McGinn IP Law Group, PLLC

(57) ABSTRACT

A method to model and change the state of associated content objects from one or more workflow and task management systems is provided. The method includes overlaying a business process model associated with a graphical content state overlay. A state of the content objects changes accordingly when the business process instance proceeds. Access rights are forwarded from human tasks in a business process to an associated content object. Concurrent access rights that are forwarded from multiple systems are handled. The graphical content state overlay areas include an active state overlay to graphically indicate a business process instance is active, an assessed overlay to graphically indicate a business process instance is assessed, an approval/rejected overlay to graphically indicate a business process instance has received one of an approval decision and a rejection decision, and a state archived overlay to graphically indicate a business process instance has been archived.

21 Claims, 11 Drawing Sheets

500

| Task state change | Content access right | Affected user |
|---|---|---|
| n/a → "ready" | Read | Potential owner of task |
| | Write | -- |
| "ready" → "claimed" | Read | Potential owner of task |
| | Write | Owner of task |
| "claimed" → "complete" | Read | Owner of task |
| | Write | -- |

METHOD AND APPARATUS TO MODEL CONTENT STATE AND ACCESS CONTROL IN BACKEND-SYSTEMS AND BUSINESS PROCESSES

BACKGROUND OF THE INVENTION

1. Field of the Invention

The present invention generally relates to a method and apparatus for modeling content states in business processes, and more particularly to providing overlays to illustrate content states in business processes.

2. Description of the Related Art

FIG. 1 illustrates related art business process model 100. Referring to FIG. 1, related art business process model 100 includes inbound process interface 110 at the beginning and outbound process interface 180 at the end of the control flow. Throughout the process illustrated in business process model 100, different steps, including decision step 130, step one 120, step two 140, step three 150, step four 160, and step five 170 may be implemented and executed. The various steps may include any known, foreseeable, or related business decision steps. These steps may contain content objects.

Content objects are structured or unstructured data, stored in a content repository, and managed by a content management system. A content object might have different states (such as "draft", "read for approval", "approved", "published") and/or access control definitions (i.e. who is allowed to read, modify or delete the content object).

In today's complex enterprise-wide business processes, content objects are accessed, used and managed by back-end systems, such as workflow management systems, ERP and CRM systems, BI tools and the like. While conventional content management applications in a content-centric environment provide direct access and management functions to end users, this interaction is now performed more often through additional, business oriented applications.

As a consequence, end-users no longer interact with the content management system directly, but now access and manipulate content objects indirectly through the business oriented back-end applications. Because these (driving) back-end systems also include management functions, a notion of "state" and "access right" to data, an "intelligent" and flexible way to integrate with content objects needs to synchronize access definitions and state properly.

Furthermore, compliance and governance impose restrictions where content objects and associated back-end systems must properly work together in a controlled and defined way to satisfy certain requirements. Today, these distinct systems typically manage state and access controls independent from each other. For example, a content object storing information about a claim application is managed by a content management system. The content object is also used in a business process, managed by a workflow management system.

In some cases, the workflow model might include a human task step where a person in charge has to work on the content object. In this situation, it is important that the person in charge gets the access rights to the associated content object that he or she needs in order to complete the defined task. Completing the task in the workflow management system might also require a state change of the content object (for example, it should be set to "ready for approval").

However, conventional solutions require extensive manual implementation for interaction between (conceptually) independent software components.

SUMMARY OF THE INVENTION

In view of the foregoing, and other, exemplary problems, drawbacks, and disadvantages of the conventional systems, it is an exemplary feature of the present invention to provide a method to model and change the state of associated content objects from one or more workflow and task management systems, the method including overlaying a business process model associated with a graphical content state overlay, changing the state of the content objects accordingly when the business process instance proceeds, forwarding access rights from human tasks in a business process to an associated content object, and handling concurrent access rights forwarded from multiple systems. The graphical content state overlay areas include an active state overlay to graphically indicate a business process instance is active, an assessed overlay to graphically indicate a business process instance is assessed, an approval/rejected overlay to graphically indicate a business process instance has received one of an approval decision and a rejection decision, and a state archived overlay to graphically indicate a business process instance has been archived.

Exemplary aspects of the present invention provide an open integration between business processes and content objects where the business process model guides the content management system to adapt state and access control. In addition, the same concept may be applied to other back-end systems (ERP and CRM systems, BI tools, etc.) as well.

Exemplary aspects of the present invention provide modeling implicit content object state changes through an "overlay structure" for the business process definition, implicit access rights forwarded from human tasks in a business process to an associated content object, handling concurrent access rights forwarded from multiple back-end systems, and explicit content object state and access right changes in a business process.

As a result, exemplary aspects of the present invention can include advantages such as less additional logic being required to guarantee matching access rights, guaranteed and defined synchronization of content and business process state, even for recovery cases, auditable and secure content object change management from within a business process, and implementation can be implemented for any pair of existing back-end and content management processes.

BRIEF DESCRIPTION OF THE DRAWINGS

The foregoing and other purposes, aspects and advantages will be better understood from the following detailed description of an exemplary embodiment of the invention with reference to the drawings, in which:

FIG. 5 illustrates an exemplary task change state mapping table 500;

DETAILED DESCRIPTION OF EXEMPLARY EMBODIMENT OF THE INVENTION

Figure 1:
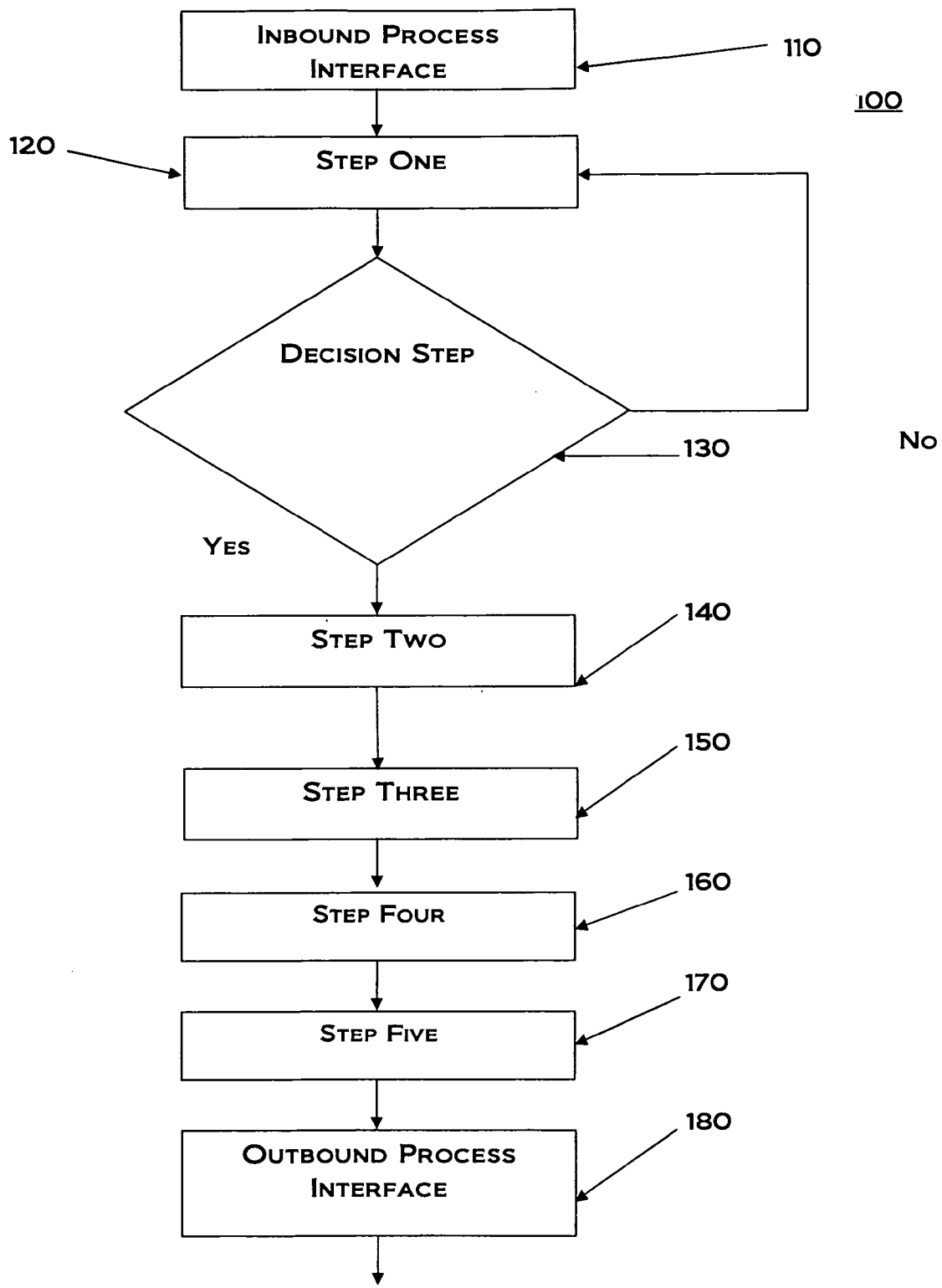
FIG. 1 illustrates one such related art business process model 100.

Referring now to the drawings, and more particularly to FIGS. 2-10, there are shown exemplary embodiments of the method and structures according to the present invention.

A business process model (or definition) includes steps (so-called activities) that are performed automatically or by humans. Human-centric business processes (such as an approval process) typically have content objects associated that are stored by a separate content management system.

Figure 2:
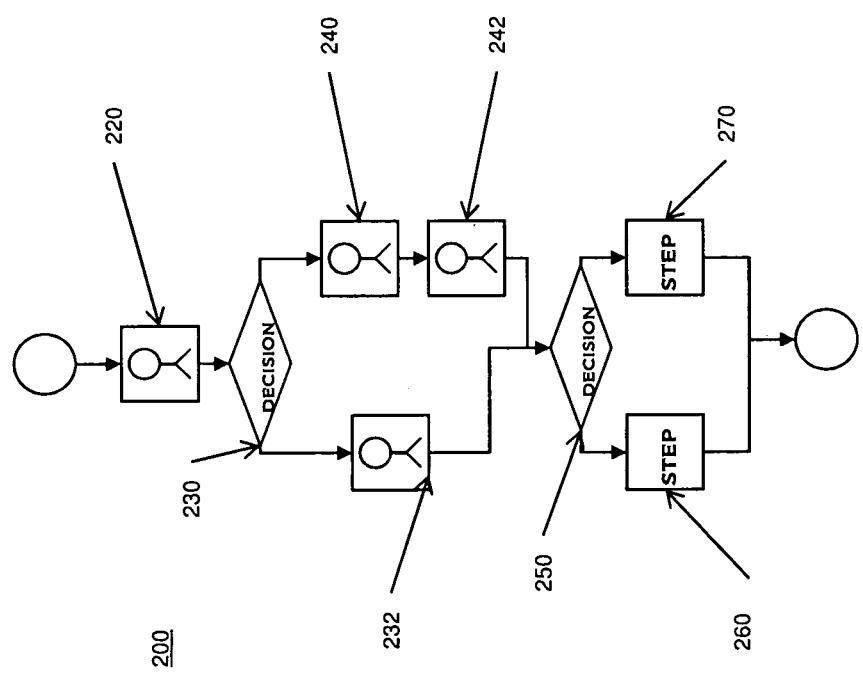
FIG. 2 illustrates an exemplary human-centric approval process 200.

FIG. 2 illustrates an exemplary human-centric approval process 200. Referring to FIG. 2, approval process 200 includes an initial assessment at Step 220 and a decision at Step 230. In Step 230, the method would determine if the assessment presents a complex case or not. A complex case would indicate that several additional processes are required, such as Steps 240 and 242 whereas a simple case would exemplarily include few steps, such as simply Step 232. Throughout Step 232, Step 240, and Step 242, humans are required to participate in the approval process 200. In Step 250, the decision is either an approval or rejection. Thus, in Step 260 the archive is approved and, alternately, in Step 270, the archive is rejected.

In the example illustrated in FIG. 2, approval describes a human task in the business process where one or more people have to perform an action. For example, a reference or link to an associated content object provides data for the people involved in the assessment to work with. This "content reference" is typically modeled as part of the business process and may be globally available for all human tasks and automated activities in the business process. Therefore, process steps 220, 232, 240, and 242 are illustrated with a figure to indicate that they are exemplary human task steps.

Figure 3:
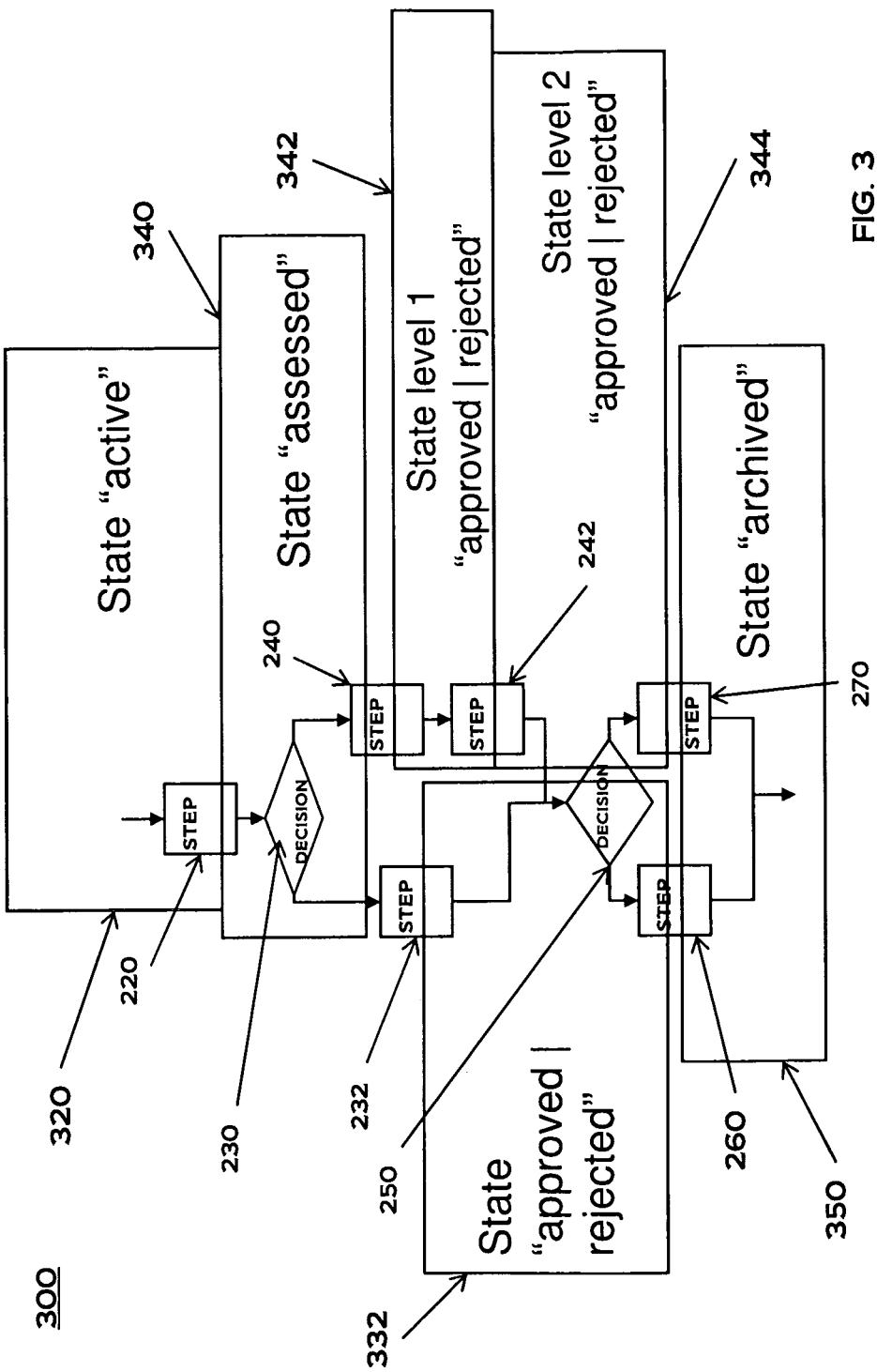
FIG. 3 illustrates an exemplary graphical overlay 300 for approval process 200 of FIG. 2.

FIG. 3 illustrates an exemplary graphical overlay 300 for approval process 200 of FIG. 2. Referring to FIG. 3, graphical overlay 300 includes distinct areas that define the state of associated content objects. Exemplarily, whenever process navigation enters a new (distinct) overlay area, the state of the associated content object would be changed accordingly. For example, if Step 232 is completed, overlay area 332 would enter "State 'approved|rejected'" and the business process navigation engine would implicitly invoke the content management system and request a state change for the associated content object. In addition, where in Step 230, the complexity has been assessed, overlay 340 may be provided to indicate that the state has been assessed. Similarly, overlay 320 would indicate that the process is active upon completion of Step 220.

Exemplarily, in order to have the content state well defined, the "overlay areas" may not overlap and all parts of the graphical business process model that interact with the document must be covered by an "overlay area". A business process definition may refer to multiple content objects. An "overlay" editor may then offer to create "overlay areas" for all these content objects separately or may offer common "overlay areas" in this case. A modeling editor may make use of different colors or shapes to render multiple "overlay areas". Another way to define "overlay areas" is to offer an additional property panel per human task or activity and allow for defining corresponding content object states by means of a drop down box in a table.

Exemplary overlay areas would also include an active state overlay, a state "assessed" overlay, a state one or state two approval/rejected overlay area, and a state archived overlay. That is, in FIG. 3, overlay area 320 indicates an area is active. Overlay area 340 indicates an item is assessed while overlays 342 and 344 indicate that levels 1 and 2 are either approved or rejected. Overlay area 350 indicates that a content object is being archived.

A business process model may be defined using WS-BPEL (an OASIS standard) and executed by a workflow management system. Exemplarily, a content reference may be added to the business process definition, for example referring a content management system by its URL and a content object by its itemID. Existing structural elements in the business process definition (such as <scope>) may be enhanced to define content object state.

The workflow management system recognizes when a new scope is entered and uses, for example, a web service communication to the content management system to change the referenced content object state accordingly. Note that for access to the content management system, an administrator userId must be defined in the workflow management system that has proper rights to perform the content object state changes.

For business process models that do not match the "single threaded graph" restriction, conflict resolution may be implemented. Conflict resolution would also be required if a content object is shared between multiple business processes that have conflicting assignment. Exemplarily, one of the following strategies may be applied: a) last writer wins (i.e. the last state change becomes effective); b) weakest resolution according a defined order on states (e.g., the earliest associated state); c) most progressive resolution according a defined order on states (e.g., the most advanced state);

If a business process fails or needs to be compensated, that failure would affect associated content objects in a straight-forward way. An additional modeling option may be offered to define the content object state that a failed business process should be set to.

Human tasks in a business process are typically managed by a human task management system. When this task gets ready for execution, the human task management system typically performs an operation called "staff resolution" to determine the group or number of people that may claim the task to work on it. This group or number of people gets (in push or pull mode) notified about the new task.

By qualifying for a task, this group or number of people typically should be able to check the associated content object to determine if they are ready to work on the task. The person (or number of persons) who decides to work on the task typically needs update rights on the content object as well. After completion of the task, a person typically should no longer be able to update the content object associated with the completed task.

Figure 4:
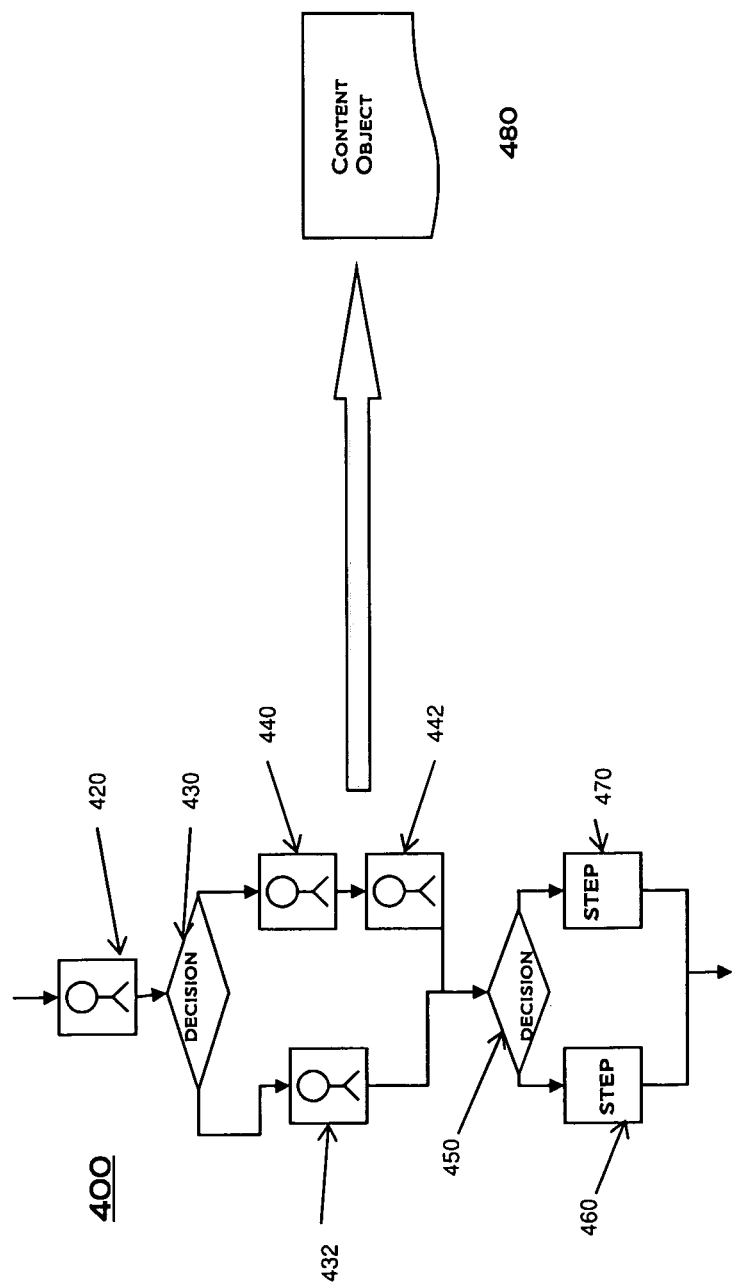
FIG. 4 illustrates exemplary approval process 400.

FIG. 4 illustrates exemplary approval process 400, similar to the example of FIG. 2, where step 440 is the currently active step and its relationship to a content object (e.g., a document) 480 that is managed by a content management system. When modeling human tasks in the context of a business process, for each associated content object a mapping table such as document 480 may be offered to define content object access right changes depending on human task state change.

Referring to FIG. 5, an exemplary task change state mapping table 500 is illustrated. In the example illustrated in FIG. 4, when the task "1st level approval" of Step 440 changes it state from "ready" in state 510 to "claimed" in state 520, then according to FIG. 5, the owner of the task should get "write" access to the content object while the potential owners of the task still should have "read" access to it. When the action is complete, owners of the content object should be able to "read," the object, but not be able to "write" to the object as illustrated in state 530. This concept can easily be extended to cover process state (and user) as well as more advanced task states. The concrete implementation for content access rights would exemplarily depend on the application and/or corporate policy.

Exemplarily, business process models would be assumed to be enriched by definitions for a connected content management system and associated content objects. Thus, mapping table 500 of FIG. 5 would be defined either as default or as an option for the process modeler and stored along with the human task definition (e.g., extending an existing task execution language). When the human task management component processes a task state change, it considers the information in the mapping table and invokes the content management system to change the access rights for the specified content object.

This operation typically requires specific user rights for the content management system and corresponding credentials must be specified in the context of the human task management system. Nonetheless, it is not sufficient to consider only task state changes for content object access because a failing business process typically must not leave the associated content object with access rights for previously assigned users. Therefore, compensation and built-in fault handler implementations are required to make sure that content access rights are being reset in case of an unexpected termination of the business process.

Figure 6:
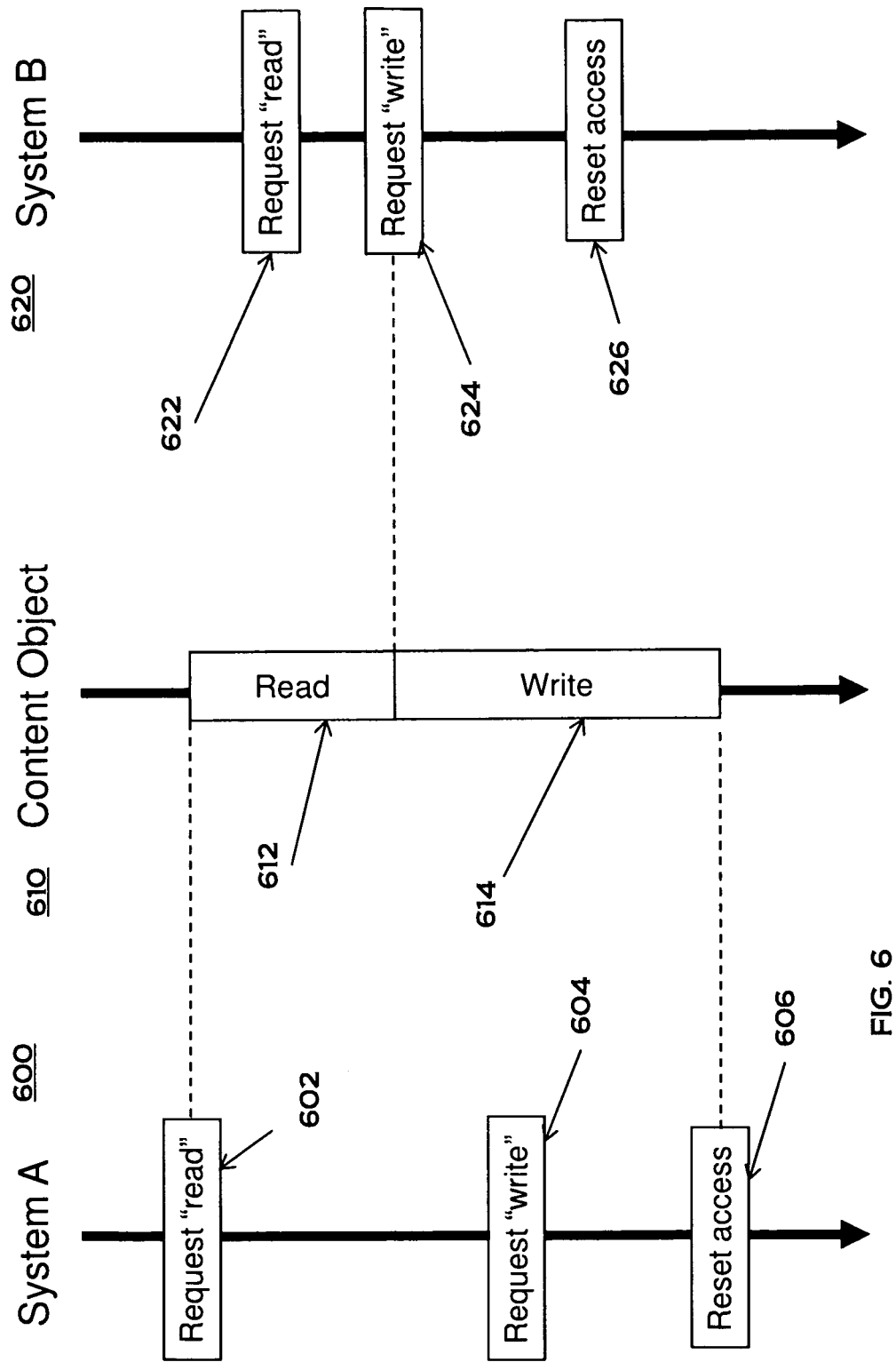
FIG. 6 illustrates an exemplary two back-end system "A" 600 and "B" 620.

FIG. 6 illustrates two exemplary back-end systems "A" and "B", represented by element numbers 600 and 620 respectively, that issue overlapping access requests to the same content object 610 for the same user over time. Both applications start accessing a content object in "read" mode 612 and then later on decide to request "write" access 614 for a certain user. Finally, both applications indicate that they don't need access to the content object anymore a "reset access" to it.

It is important to note that the "reset access" request of system "B" must not cause access removal for the user since he or she still needs access due to the state of System "A". This and other complex scenarios cannot be solved without maintaining a history or current access that has been in effect when requesting an access change.

Exemplarily, an access request stack for each content object is provided and would be a central component and can either be included in the content management system or be a separate component that is accessed by all back-end systems in the scenario.

Figure 7:
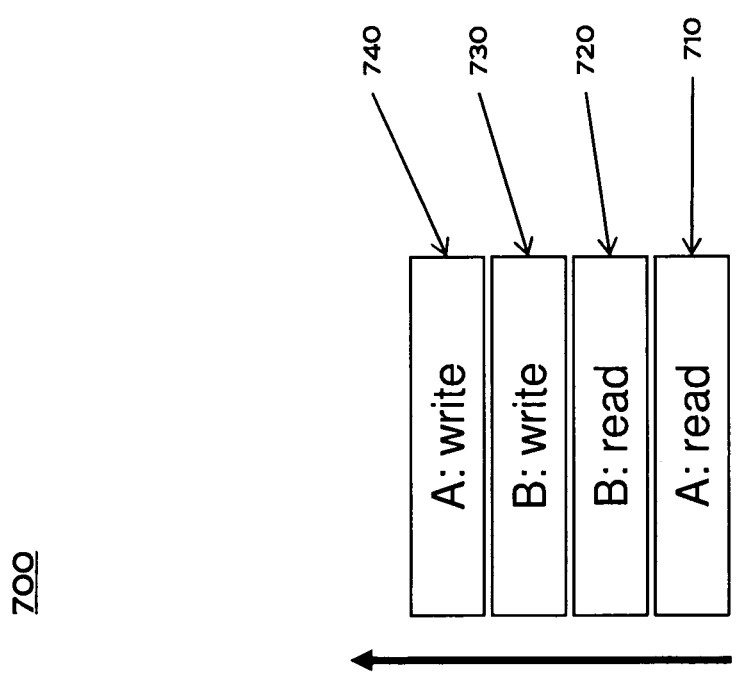
FIG. 7 illustrates an exemplary state of the stack after the write request of system "A" 600 and before the "reset access" of system "B" 620.

Referring to the access pattern in FIG. 6, FIG. 7 illustrates exemplary state of the stack 700 after the write request of system A and before the "reset access" of system B. This (sequential) history information enables the central assignment component to determine the effective access right and makes sure that the user gets exactly the right he or she needs to access a content object in the used systems. For the example, the "reset access" request 626 of FIG. 6 would remove both "B: read" 720 and "B: write" 730 from the stack and leave "A: read" 710 and "A: write" 740 on top of it. Consequently, the user would still have right access to the content object.

Figure 8:
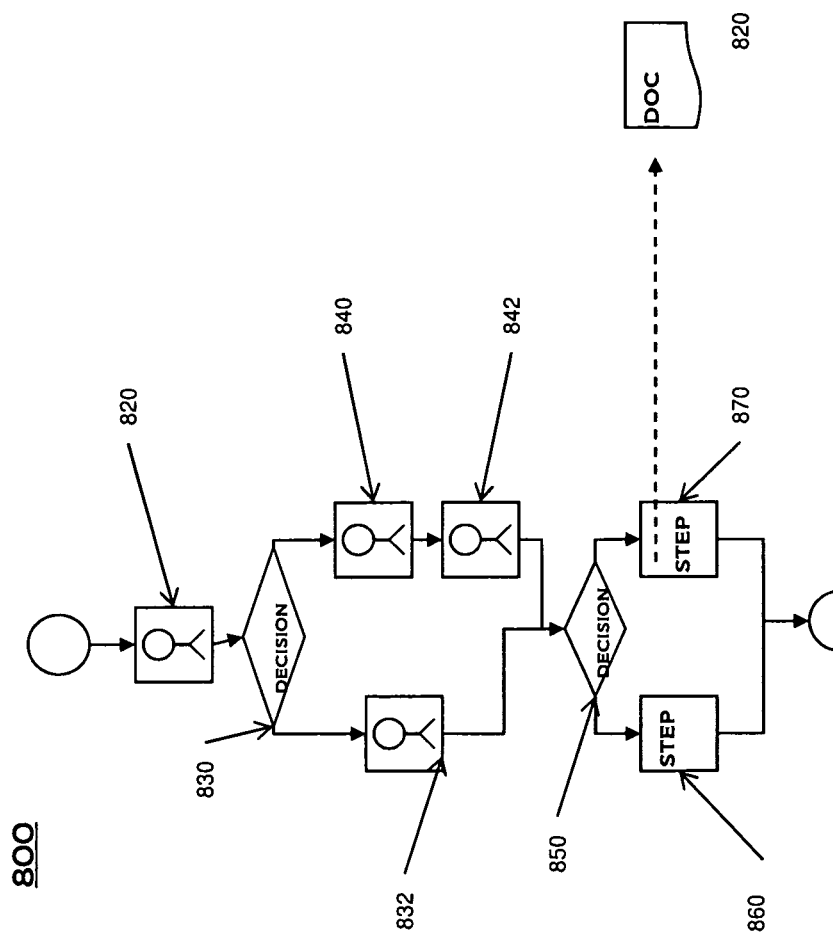
FIG. 8 illustrates an exemplary business process 800.

In addition to implicit state and access right changes as outlined above, changes to the associated content model may be considered part of the business logic rather than an implicit operation that takes place as a side effect of business process and task navigation. FIG. 8 illustrates an exemplary business process 800 with human tasks that have explicit steps, such as Step 870 that changes an associated content object's access to "read only," as illustrated by the arrow of document 820. This happens regardless of previously assigned access rights and is important in a compliant regulated environment to ensure that after certain steps in a business process nobody is allowed to alter the a content object any longer.

Figure 9:
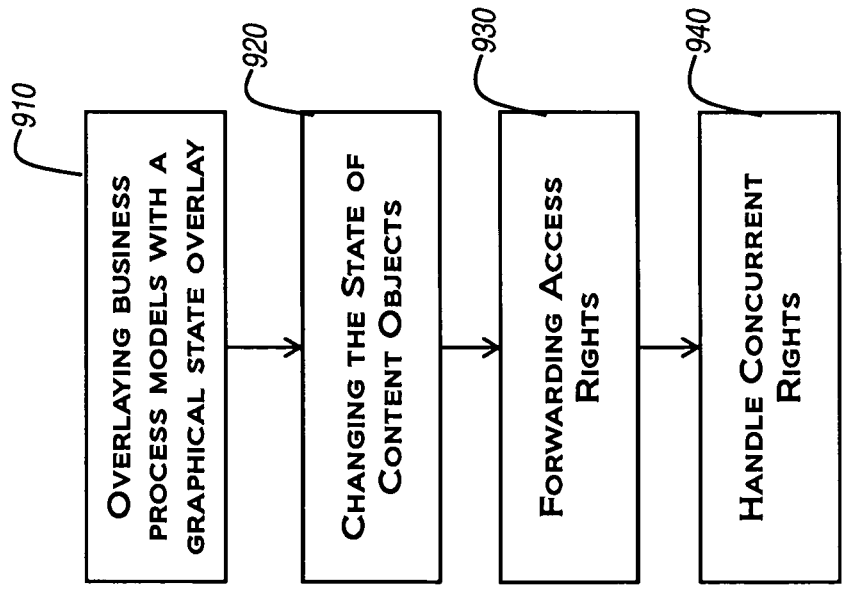
FIG. 9 illustrates an exemplary method 900.

FIG. 9 illustrates method 900 to handle status updates among business processes. Referring to FIG. 9, in Step 910, a business process model is overlaid with an associated graphical content state overlay. In Step 920, states of the content objects are changed accordingly when the business process instance proceeds. Then in Step 930, access rights are forwarded from human tasks in a business process to an associated content object. And in Step 940, concurrent access rights forwarded is handled from between multiple systems.

Figure 10:
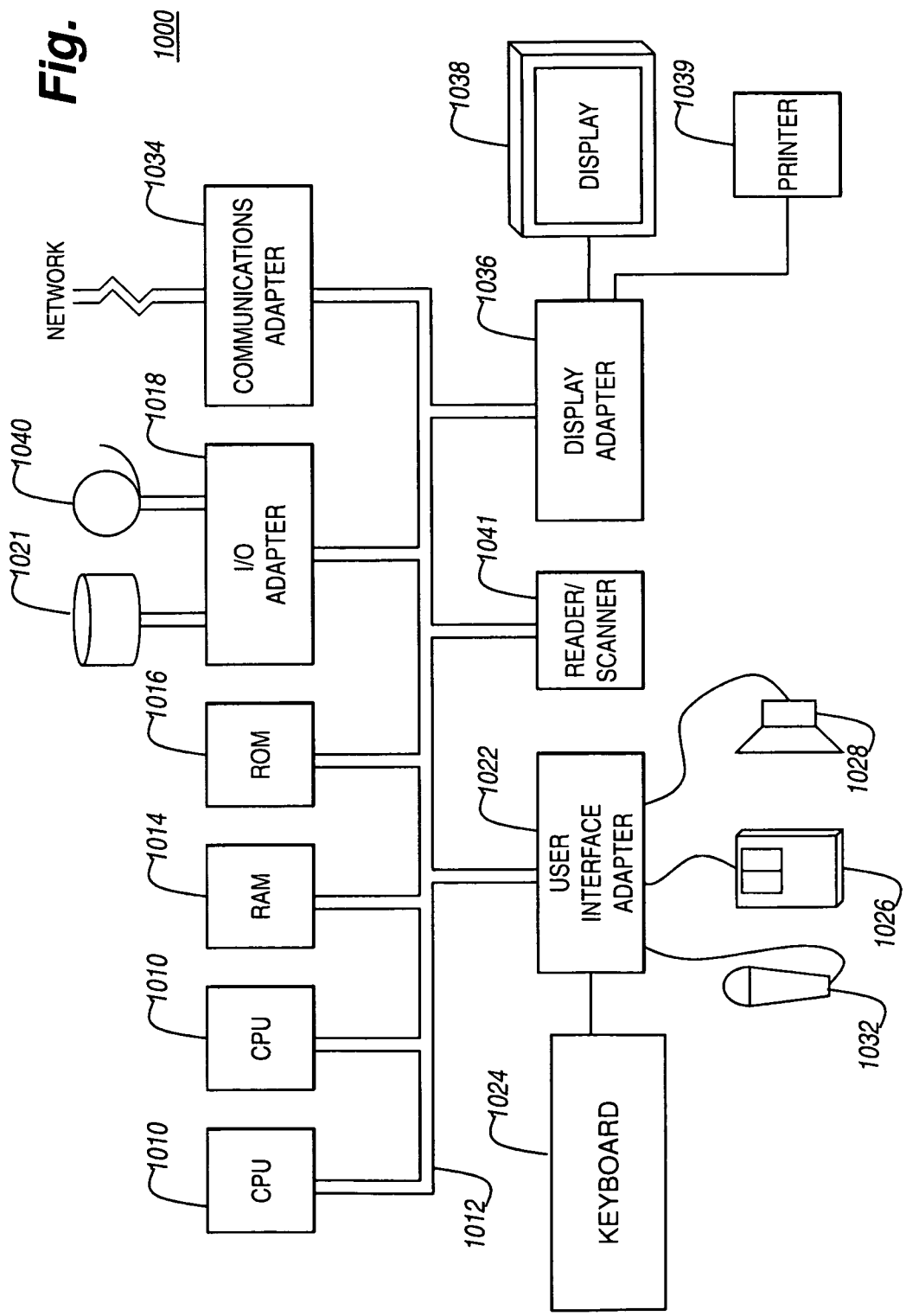
FIG. 10 illustrates a typical hardware configuration which may be used for implementing the computer system and method according to the exemplary aspects of the present invention.

Referring now to FIG. 10, system 1000 illustrates a typical hardware configuration which may be used for implementing the inventive system and method for buying and selling merchandise. The configuration has preferably at least one processor or central processing unit (CPU) 1010. The CPUs 1002 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, and Intranet, a personal area network (PAN), etc., and a display adapter 1036 for connecting the bus 1012 to a display device 1038 and/or printer 1024. Further, an automated reader/scanner 1041 may be included. Such readers/scanners are commercially available from many sources.

Such a method may be implemented, for example, by operating a computer, as embodied by a digital data processing apparatus, to execute a sequence of machine-readable instructions. These instructions may reside in various types of signal-bearing storage media.

Thus, this aspect of the present invention is directed to a programmed product, including signal-bearing media tangibly embodying a program of machine-readable instructions executable by a digital data processor to perform the above method.

Thus, this aspect of the present invention is directed to a programmed product, comprising signal-bearing storage media tangibly embodying a program of machine-readable instructions executable by a digital data processor incorporating the CPU 1010 and hardware above, to perform the method of the invention.

Figure 11:
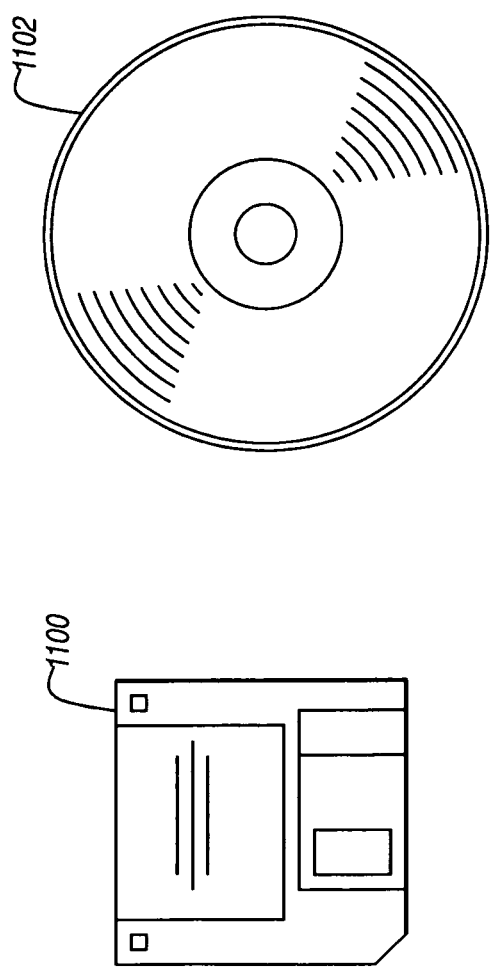
FIG. 11 illustrates a magnetic data storage diskette 1100 or CD-ROM 1102 to store the method 900.

This signal-bearing media may include, for example, a RAM contained within the CPU 1010, as represented by the fast-access storage for example. Alternatively, the instructions may be contained in another signal-bearing media, such as a magnetic data storage diskette 1100 or CD-ROM 1002, (FIG. 11), directly or indirectly accessible by the CPU 1110.

Whether contained in the computer server/CPU 910, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including storage devices in transmission media, such as digital and analog storage devices in communication links and in wireless interfaces. In an illustrative embodiment of the invention, the machine-readable instructions may comprise software object code, complied from a language such as "C," etc.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

The invention claimed is:

1. A method, as performed by a processor in a computer, to model and change a state of associated content objects from one or more workflow and task management systems, the method comprising:

overlaying, as performed by the processor, on top of a business process model, at least one associated graphical content state overlay that indicates a current state of content objects associated with the business process model, the content objects comprising data stored in a content repository for managing workflow in the business process model and managed by a content management system such that each content object has at least one of:
  one of a plurality of possible current states; and
  an access control definition defining authority to read, modify, or delete the content object;
and
changing, by the processor, a state of the content objects accordingly when the business process instance associated with a content object proceeds in accordance with data in the content repository for that content object.

2. The method according to claim 1, further comprising forwarding access rights from human tasks in a business process to an associated content object.

3. The method according to claim 2, further comprising handling concurrent access rights forwarded from multiple systems.

4. The method according to claim 1, wherein the graphical content state overlay areas comprise an active state overlay to graphically indicate a business process instance is active.

5. The method according to claim 4, wherein the graphical content state overlay areas further comprise an assessed overlay to graphically indicate a business process instance is assessed.

6. The method according to claim 5, wherein the graphical content state overlay areas comprise an approval/rejected overlay to graphically indicate a business process instance has received one of an approval decision and a rejection decision.

7. The method according to claim 6, wherein the graphical content state overlay areas comprise a state archived overlay to graphically indicate a business process instance has been archived.

8. A task management system, comprising:
a processor on a computer; and
a memory storing instructions to cause said processor to execute:
  an overlaying unit configured to overlay a business process model associated with a graphical content state overlay; and
  a changing state unit to change a state of content objects associated with business process instances of the business process model accordingly when the business process instance proceeds in accordance with data stored in a content repository for managing workflow in the business process model and managed by a content management system.

9. The task management system according to claim 8, said instructions further comprising access rights forwarding unit to forward access rights from human tasks in a business process to an associated content object.

10. The task management system according to claim 9, said instructions further comprising a concurrent rights handling unit configured to handle concurrent access rights forwarded from multiple systems.

11. The task management system according to claim 8, wherein the graphical content state overlay areas comprise an active state overlay to graphically indicate a business process instance is active.

12. The task management system according to claim 11, wherein the graphical content state overlay areas further comprise an assessed overlay to graphically indicate a business process instance is assessed.

13. The task management system according to claim 12, wherein the graphical content state overlay areas comprise an approval/rejected overlay to graphically indicate a business process instance has received one of an approval decision and a rejection decision.

14. The task management system according to claim 13, wherein the graphical content state overlay areas comprise a state archived overlay to graphically indicate a business process instance has been archived.

15. A computer program product for modeling and changing a state of associated content objects from one or more workflow and task management systems, comprising:
a non-transitory computer readable storage medium having computer readable program code tangibly embodied therein, the computer readable program code comprising computer readable program code configured to:
overlay, as performed by a digital processing apparatus, on top of a business process model an associated graphical content state overlay; and
change, by a processor in the digital programming apparatus, a state of content objects accordingly when a business process instance associated with an content object proceeds in accordance with data stored in a content repository for managing workflow in the business process model and managed by a content management system.

16. The computer program product according to claim 15, wherein the computer readable program code is further configured to forward access rights from human tasks in a business process to an associated content object.

17. The computer program product according to claim 16, wherein the computer readable program code is further configured to handle concurrent access rights forwarded from multiple systems.

18. The computer program product according to claim 15, wherein the graphical content state overlay areas comprise an active state overlay to graphically indicate a business process instance is active.

19. The computer program product according to claim 18, wherein the graphical content state overlay areas further comprise an assessed overlay to graphically indicate a business process instance is assessed.

20. The computer program product according to claim 19, wherein the graphical content state overlay areas comprise an approval/rejected overlay to graphically indicate a business process instance has received one of an approval decision and a rejection decision.

21. The computer program product according to claim 20, wherein the graphical content state overlay areas comprise a state archived overlay to graphically indicate a business process instance has been archived.

\* \* \* \* \*